Dec. 20, 1938.  R. E. MILLER  2,140,625
SPEED CONTROLLED BRAKE
Filed Aug. 1, 1936
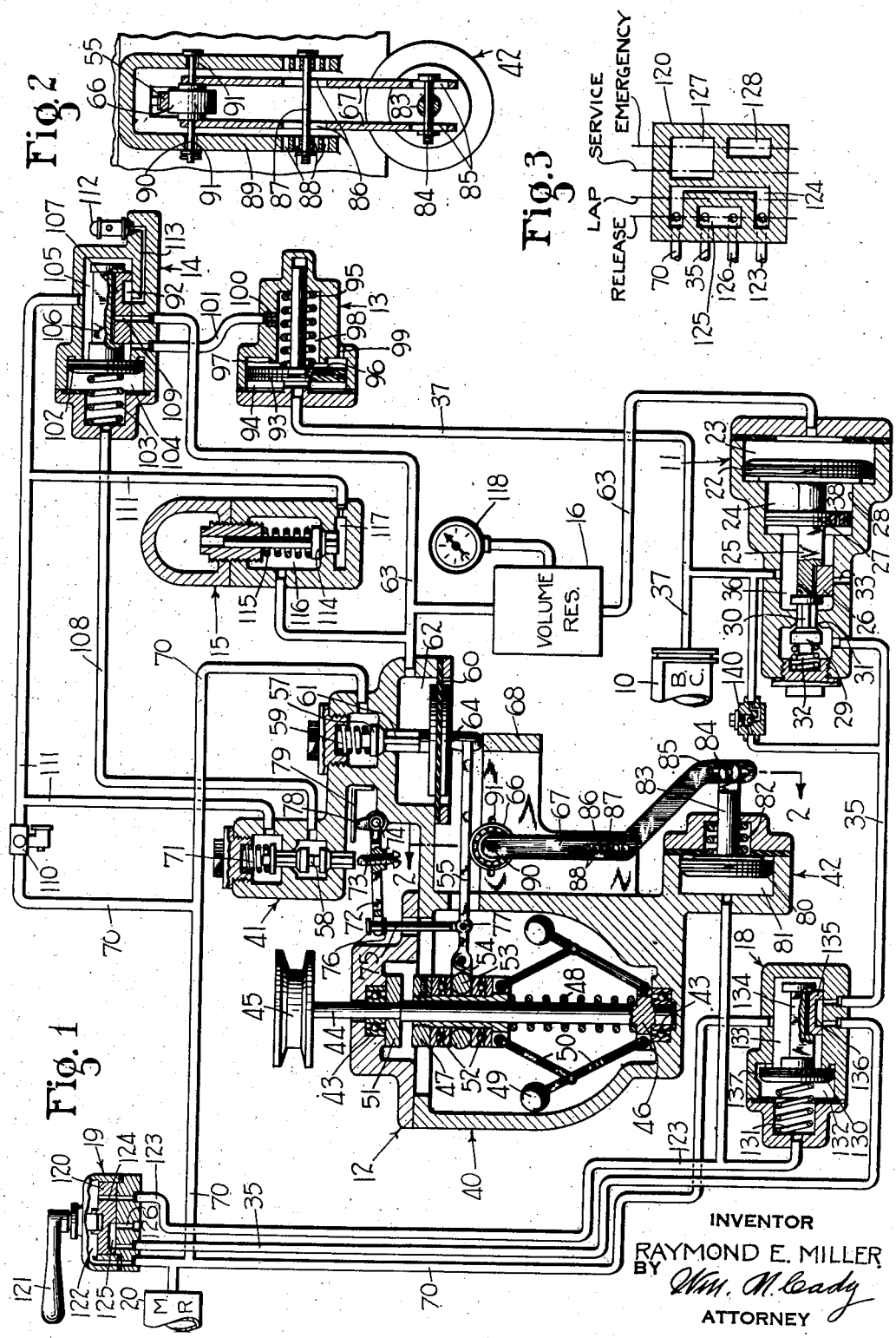
INVENTOR
RAYMOND E. MILLER
BY Wm. N. Cady
ATTORNEY Patented Dec. 20, 1938

2,140,625

UNITED STATES PATENT OFFICE 2,140,625

SPEED CONTROLLED BRAKE

Raymond E. Miller, Wilkinsburg, Pa., assignor to The Westinghouse Air Brake Company, Wilmerding, Pa., a corporation of Pennsylvania Application August 1, 1936, Serial No. 93,864

18 Claims. (Cl. 303—21)

This invention relates to speed controlled brakes, and in particular to brake systems for railway vehicles and trains in which the degree of braking is controlled with relation to the speed of the vehicle or train.

The standard type of brake at present employed on railway vehicles is the friction type brake, comprising brake shoes operating on the treads of the vehicle wheels. The braking produced by the brake shoes on the vehicle wheels is dependent upon the coefficient of friction between the brake shoes and the wheel treads. As is generally understood in the braking art this coefficient of friction changes with changes in speed of the vehicle, being relatively low at high vehicle speeds and increasing (but not proportionately) as the vehicle speed decreases, finally becoming a maximum at the end of the stop.

If when the vehicle is traveling at a high speed the brakes are applied with a maximum braking force, then as the speed of the vehicle diminishes the braking force must in some manner be reduced, or otherwise sliding of the vehicle wheels may result at low speeds due to the rapidly increasing coefficient of friction between the brake shoes and the wheel treads. In order to stop a vehicle in the shortest possible distance the degree of braking should not be reduced more than is necessary to avoid wheel sliding. It is therefore desirable that the degree of braking force be controlled with relation to the increase in the coefficient of friction between the brake shoes and the wheel treads as the speed of the vehicle diminishes.

Recent tests on trains operating at extremely high speeds, as for example speeds in the neighborhood of one hundred miles per hour, show that when a vehicle is traveling at extremely high speed the brakes may be applied with a very high degree of braking force and this braking force maintained until a relatively low speed has been reached, at which time it is necessary that the degree of braking force be reduced in order to avoid excessive wheel sliding. The tests further show that the maximum braking force with which the brakes may be applied at high speeds is substantially a function of the initial speed at the time of the brake application. That is to say, a high braking force may be employed at a very high initial speed, while a somewhat lower braking force must be employed at a lower initial speed. While different braking forces must be employed for different initial high speeds each braking force may be maintained substantially constant as the vehicle decelerates until a relatively low speed is reached, at which time it is necessary to reduce the braking force to a relatively lower value in order to avoid excessive wheel sliding.

To illustrate the foregoing, assume a train capable of traveling at a maximum speed of one hundred miles per hour. If this train is equipped with a brake system of a particular design the brakes may be applied when the train is traveling at one hundred miles per hour to variable degrees up to approximately one hundred and forty pounds brake cylinder pressure. This maximum brake cylinder pressure may be maintained constant until the train has decelerated to a speed of approximately twenty-five miles per hour, at which time it is necessary to reduce the brake cylinder pressure to some low value, as for example twenty-five or thirty pounds, in order to prevent excessive wheel sliding.

If now at the time of application of the brakes the train is traveling at eighty miles per hour the maximum brake cylinder pressure should not exceed ninety pounds, and this brake cylinder pressure may be maintained constant down to the same low vehicle speed as for the previous application, namely twenty-five miles per hour, at which time the brake cylinder pressure should also be reduced to approximately twenty-five or thirty pounds.

If at the time of the brake application the train is traveling at sixty miles per hour the maximum brake cylinder pressure should not exceed fifty pounds and this brake cylinder pressure may be maintained constant to the same low vehicle speed as before. It has been determined from operating experience that for vehicle speeds below sixty miles per hour the initial maximum brake cylinder pressure may be the same as that for sixty miles per hour, namely fifty pounds, and this value may be maintained constant until the same low speed has been reached as for the previously considered applications.

Therefore, for the particular apparatus and train assumed, the initial brake cylinder pressure between vehicle speeds of sixty and one hundred miles per hour should be a function of the speed at the time of the brake application, but for speeds below sixty miles per hour the same maximum initial brake cylinder pressure may be safely employed. In all cases, however, the initial brake cylinder pressure should be reduced to a low value at a vehicle speed in the neighborhood of twenty-five miles per hour, so that the vehicle may be brought to a stop with a minimum of wheel sliding.

I am, of course, aware of the fact that brake systems may be developed for controlling brake cylinder pressure with relation to vehicle speed in a specific manner different from that just described, but I prefer a control substantially in the manner set forth. It is therefore a principal object of the present invention to provide a brake system in which the initial maximum brake cylinder pressure is a function of the initial vehicle speed above some intermediate speed, as for example the sixty miles per hour mentioned, and which provides for holding the initial maximum brake cylinder pressure constant down to a relatively low speed, as for example the twenty-five miles per hour mentioned, and thereafter reducing the brake cylinder pressure to a relatively low value and maintaining this low value until the vehicle or train is brought to a stop.

In accordance with the above a further object of the invention is to provide a brake system of the character just referred to in which the initial maximum brake cylinder pressure is constant for an intermediate speed range, as for example between twenty-five and sixty miles per hour as above mentioned, and is automatically reduced when the vehicle speed diminishes to the lower speed of this speed range.

Since safety is a cardinal principle in the operation of railways, it is desirable that a brake system should incorporate any feature or features which insure a degree of application of the brakes sufficient to bring the train or vehicle to a stop upon the failure of certain of the control parts. Accordingly therefore it is a yet further object of my invention to provide a brake system of the character hereinbefore referred to, which is at all times conditioned to permit a degree of braking sufficient to bring the train to a stop even though the speed controlled mechanism which forms a major element in the control is for any reason rendered inoperative.

A still further object of the invention is to provide a brake system which is all pneumatic in character and which employs only well known and thoroughly tried and proven pneumatic devices.

Yet another object of the invention is to provide a speed responsive mechanism which operates upon relatively small movements in response to speed changes to perform its control functions, and which because it requires only small movements may be manufactured economically.

Still another object of the invention is to provide a brake system of the speed responsive character before referred to which is adaptable to either straight air or automatic brake systems, or to a combination of the two, and which provides for an increased degree of application of the brakes when making emergency applications over the degree normally permitted for service applications.

Other objects and advantages of the invention dealing with specific constructions and arrangements of parts will be more fully understood from the following description of the invention, which is taken in connection with the attached drawing, wherein, Fig. 1 shows in schematic and diagrammatic form an embodiment of the invention adapted to a simplified form of combined straight air and automatic brake system for a single railway vehicle.

Fig. 2 is a fragmentary sectional view taken along the line 2—2 of Fig. 1, showing parts of the speed responsive device there illustrated.

Fig. 3 shows in diagrammatic form the ports of the brake valve shown to the upper left of Fig. 1.

In order to facilitate the understanding of the invention the embodiment illustrated in Fig. 1 has been shown in its simplest and most elementary form, rather than in the commercial form which employs more elaborate devices than those illustrated and which in addition employs a number of conventional devices here eliminated for the sake of clarity.

Considering briefly at first the parts and devices illustrated, a brake cylinder for operating a conventional type of wheel brake is shown at 10, a control valve device for limiting brake cylinder pressure is shown at 11, a speed responsive device at 12, an exhaust valve device at 13, a low speed limiting valve device at 14, a low speed pressure maintaining valve device at 15, a volume reservoir or what I prefer to call a "master volume" at 16, an automatic valve device at 18, and a manually operated brake valve device at 19. A source of fluid under pressure is represented by a main reservoir 20, which may be connected to the usual compressor (not shown).

Considering now more in detail the devices above enumerated, the control valve device 11 is embodied in a casing having a piston 22 which is subject on its right hand side to pressure of fluid in a chamber 23 and on its left hand side to pressure of fluid in a chamber 24. The piston 22 is provided with a stem 25 which is recessed to receive and operate a slide valve 26 coextensive with movement of the piston. A guiding element 27 integral with the stem 25 works in a bore 28 to guide movement of the piston.

The control valve device 11 is also provided with a supply valve 29 having a fluted stem 30 and urged toward a seated position upon a seat 31 by a biasing spring 32.

When fluid pressure is present in the chamber 23 the piston 22 is biased to the left as shown, in which case the slide valve 26 blanks an exhaust port 33 and the left end of the piston stem 25 holds the supply valve 29 unseated. With the valve 29 unseated fluid under pressure may flow from a straight air pipe 35 past the unseated valve 29 to slide valve chamber 36, and from thence by way of pipe 37 to the brake cylinder 10.

Fluid under pressure in the slide valve chamber 36 also flows through a small port 38 in the guiding member 27 to the chamber 24, and when the pressure in this chamber is equal to or slightly overbalances the pressure in the chamber 23, the spring 32 shifts the piston 22 to the right until the valve 29 is seated. For this position of the piston the slide valve 26 continues to blank the exhaust port 33, but if the pressure in chamber 23 should subsequently be reduced the piston 22 will move to its extreme right hand position where slide valve 26 will uncover the exhaust port 33 and thus release fluid under pressure from the brake cylinder 10.

The speed responsive device 12 comprises a centrifuge section 40, a valve section 41, and an emergency section 42.

The centrifuge section 40 is embodied in a casing having operatively mounted therein on roller bearings 43 a shaft 44 which by means of a pulley 45, or other suitable coupling, is driven at a speed proportional to the speed of the vehicle. I have shown the pulley 45 as adapted to receive a V-belt which provides for driving the shaft 44 with minimum slippage. It will, of course, be understood that the shaft 44 may be geared or otherwise connected to any member on the vehicle which rotates at a speed proportional to the vehicle speed.

Formed integrally with or rigidly secured to the shaft 44 is a collar 46 and slidably disposed on the shaft 44 is a sleeve 47. These two members are urged apart by a spring 48 and are urged together when the vehicle is in motion by means of centrifuge weights 49 connected thereto in the usual manner by links 50. As will be obvious from the arrangement shown, when the shaft 44 is rotated the centrifgual force acting on the weights 49 will tend to urge the sleeve 47 downwardly against the opposition of the spring 48. I prefer to design the spring 48 so as to have an initial tension placed thereon such that the shaft 44 must be rotated at a speed corresponding to some low vehicle speed, as for example twenty-five miles per hour, before the sleeve 47 will be moved from disengagement with a stop member 51. After the sleeve 47 has disengaged from the stop member 51, and for vehicle speeds above the aforesaid low speed of twenty-five miles per hour, the sleeve 47 will be moved downwardly proportional to the increase of speed above this low value.

The sleeve 47 is provided with two roller bearings 52 between which is disposed a ring 53 having a lug 54 integral therewith, to which is attached one end of a lever 55. The lever 55 is provided for operating the valve section 41, which will now be described.

This valve section is provided with two valves, a supply valve 57 and a double beat valve 58. The supply valve 57 is urged toward a seated position by a spring 59 and may be unseated by upward movement of a diaphragm 60 which engages a fluted stem 61 of the valve. The diaphragm 60 is so arranged as to provide thereabove a pressure tight chamber 62 to which fluid under pressure may be supplied by way of a pipe 63.

Acting below the diaphragm 60 is a lug 64 secured to the other end of the aforementioned lever 55. As may be seen, the lever 55 may fulcrum about a ball bearinged roller 66 carried by spaced levers 67, or it may fulcrum about its right end on a stop shelf 68.

Assuming that the roller 66 provides a fixed fulcrum for the lever 55, when the vehicle is traveling at a high speed, as above sixty miles per hour, the sleeve 47 of the centrifuge section 40 will be moved downwardly whereupon the lever 55 will be rocked in a counterclockwise direction about the roller 66. The right end 64 of the lever 55 will move the diaphragm 60 upwardly thus causing the supply valve 57 to be unseated. Unseating of this valve will connect a pipe 70 with the chamber 62. The pipe 70 leads to the main reservoir 20, and for convenience this pipe, together with its branches, will be hereinafter referred to as the main reservoir pipe. Fluid under pressure may then flow from the main reservoir 20 to the chamber 62, and when the pressure acting on the diaphragm 60 from chamber 62 slightly overbalances the upward pressure acting below the diaphragm due to the force exerted by the centrifuge device, the diaphragm 60 will be moved downwardly and permit the valve 57 to be seated by the spring 59.

Now as will be obvious, the upward force exerted below the diaphragm 60 due to action of the centrifuge device is substantially proportional to the square of the vehicle speed. Therefore, since this force is opposed only by the pressure of fluid in the chamber 62, it follows that in order for the diaphragm to remain in the illustrated position the pressure in this chamber must be approximately proportional to the square of the vehicle speed. This will not be true for all vehicle speeds for a reason which will hereinafter be fully explained.

The double beat valve 58 is urged toward a lower seated position by a spring 71 and may be actuated to an upper seated position upon upward movement of a small arm 72 carrying an adjustable screw 73. The arm 72 is pivotally mounted at one end to the speed responsive device casing at 74 and has its other end bifurcated to receive a link 75 provided with collars 76 on either side of the lever 72. The link 75 has a pivotal connection with the aforementioned lever 55 at 77, so that when the lever 55 is rotated in a clockwise direction through a suitable distance the small arm 72 will be actuated upwardly, and thereby shift the double beat valve 58 from a lower seated position to an upper seated position.

In order that the movement of the double beat valve 58 shall take place with a snap action, the small arm 72 is provided with a lug 78 in contact with a spring 79 secured to the casing. The lug 78 is so disposed that just as the screw 73 engages the protruding stem of the double beat valve 58 it passes over dead center with respect to the spring 79 and the action of the spring together with the upward thrust on the link 75 causes the small arm 72 to move quickly upward and thereby shift the double beat valve 58 quickly to its upper seated position.

As will be more fully understood later from a description of operation of the invention, the speed responsive device 12 is so designed that for vehicle speeds above twenty-five miles per hour the parts of the centrifuge device will assume positions such that double beat valve remains in its lower seated position, as shown in the drawing, but when the vehicle speed passes below twenty-five miles per hour the sleeve 47 will move toward engagement with the stop 51 and at the same time rotate the lever 55 about its right end, where it fulcrums on the stop shelf 68, and thereby shift the double beat valve 58 to its upper seated position.

The emergency section 42 is provided to change the position of the roller 66, so as to change the fulcrum point of the lever 55, when making an emergency application of the brakes. This section comprises a piston 80 subject on its left hand side to pressure of fluid in a chamber 81 and on its right hand side to pressure of a spring 82. The piston 80 is provided with a stem 83 which is secured between the lower ends of the spaced levers 67 by a pin 84. The pin 84 passes through slots 85 so as to prevent binding between the piston stem 83 and the spaced levers upon movement of the piston.

The piston chamber 81 is normally maintained charged with fluid under pressure, so that the piston 80 is positioned to the right, as illustrated, and the roller assumes a definite position and acts, so long as the chamber 81 is charged, as a fixed fulcrum point. When the pressure in chamber 81 is reduced the piston 80 moves to its left hand position and shifts the roller 66 to the right so as to change the relation between the moment arms of the lever 55.

In order to provide for different ratios between these moment arms the spaced levers are slotted at 86 so that a fulcrum pin 87 may be placed in one pair of a plurality of pairs of aligned holes 88 in a supporting member 89 of the speed responsive device casing. As will be obvious, by inserting the pin 87 in different pairs of the holes 88 the fulcrum for the spaced levers may be changed, so that the leftward movement of the piston 80 will position the roller 66 at different points. The pin 90 upon which the roller 66 is carried extends through slots 91 in the supporting member 89 so as to keep the travel of the roller 66 to the left or right in a straight line.

The exhaust valve device 13 is embodied in a casing containing a piston 93 subject on its left hand side to pressure of fluid in a chamber 94 and on its right hand side to pressure of a spring 95. The piston carries on its right hand side a seating gasket 96 which is adapted when the piston is actuated to the right to seat on a seat rib 97, to thereby close communication between spring chamber 98 and an exhaust port 99. The spring chamber 98 is connected by way of a small choke 100 to a pipe 101 leading to the low speed limiting valve device 14.

The chamber 94 is connected to the brake cylinder pipe 37, as illustrated, and when the brakes are released the piston 93 is positioned to the left by the spring 95. When, however, a brake application is made and fluid under pressure is supplied to the brake cylinder 10, as the brake cylinder pressure rises above some predetermined value, as for example ten pounds, the piston 93 moves to the right where the gasket 96 seals on the seat rib 97.

The low speed limiting valve device 14 is embodied in a casing having a piston 102 subject on its left hand side to the combined pressure of a spring 103 and the pressure of fluid in chamber 104, and subject on its right hand side to the pressure of fluid in a slide valve chamber 105. The piston 102 is provided with a stem 106 which is recessed to receive and move a slide valve 107 coextensive with movement of the piston.

The chamber 104 is connected by way of pipe 108 to the valve section 41 of the speed responsive device, as illustrated, and is normally charged with fluid under pressure when the double beat valve 58 is in lower seated position. Fluid under pressure is supplied to this chamber from the main reservoir 20 by way of the main reservoir pipe 70, a feed valve device 110, which is preferably of conventional design, a feed valve pipe 111 and pipe 108. The slide valve chamber 105 is also connected to the feed valve pipe 111 so that with the double beat valve 58 unseated the fluid pressures acting to the right and left of the piston 102 are equal, and the spring 103 biases the piston 102 to its right hand position.

In the right hand position of the piston 102 the slide valve 107 opens a communication from the slide valve chamber 105 to the pipe 101 leading to the exhaust valve device 13. At the same time, a port 109 in the slide valve opens a communication between the slide valve chamber and the aforementioned pipe 63.

When the pressure in chamber 104 is suddenly reduced the piston 102 moves full distance to the left and carries with it the slide valve 107. In the left hand position of the piston 102 the slide valve 107 blanks communication to the pipe 101, and cavity 92 in the slide valve connects the pipe 63 to a passage 113 which is in communication with the atmosphere by way of a conventional type safety valve device 112. The safety valve device 112 is set to prevent the release of fluid under pressure to the atmosphere from the pipe 63 below a predetermined value, as for example twenty-five or thirty pounds.

The low speed pressure maintaining valve device 15 is embodied in a casing having a check valve 114 therein urged toward a seated position by a spring 115. A chamber 116 above the valve 114 is connected to the pipe 63, as illustrated, while a chamber 117 below the valve is connected to the feed valve pipe 111. The valve 114 and the spring 115 are so designed that when the fluid pressure in the chamber 116 falls below some predetermined value, as for example twenty-five or thirty pounds, the valve 114 will unseat to permit fluid under pressure to flow from chamber 117 and feed valve pipe 111 to the chamber 116 and pipe 63, until the desired pressure has been obtained, whereupon the valve 114 will again seat. The valve device 15 therefore functions to maintain a desired fluid pressure in the pipe 63 and the volumes connected thereto.

As will be seen from the drawing, the volume reservoir 16, or what I call the "master volume", is connected in the pipe 63 so that the chamber 62 in the speed responsive device 12, the chamber 23 in the control valve device 11, the chamber 116 in the low speed pressure maintaining valve device 15, and the slide valve chamber 105 (in the illustrated position) of the low speed limiting valve device 14 are all in communication and consequently at the same pressure at any given time. Connected to the volume reservoir 16 is a pressure indicating device 118, which may be either calibrated in pressure values or calibrated to indicate speed ranges, as will hereinafter more fully appear.

The brake valve device 19 is embodied in a casing containing a rotary valve 120 adapted to be rotated upon movement of a handle 121. The handle 121, as in conventional practice, has a release position, a service position, an emergency position, and a lap position. The handle 121 is illustrated in the release position, in which position the rotary valve connects a chamber 122 to a brake or emergency pipe 123, by way of a port 124 in the rotary valve. The chamber 122 is in open communication with the main reservoir 20 by way of the main reservoir pipe 70, so that the brake or emergency pipe 123 is charged to main reservoir pressure.

Also, in release position of the handle 121, the cavity 125 in the rotary valve connects the straight air pipe 35 to an exhaust port 126.

When the handle 121 is moved to the service position, a port 127 in the rotary valve (see Fig. 3) connects the main reservoir pipe 70 to the straight air pipe 35, while at the same time blanking the exhaust port 126. The communication to the brake or emergency pipe is at this time lapped.

When the handle 121 is moved to the emergency position a port 128 in the rotary valve connects the brake or emergency pipe 123 to the exhaust pipe 126, to reduce the pressure therein, and at the same time connects the straight air pipe 35 to the main reservoir pipe 70. When the handle 121 is moved to the lap position both the straight air pipe and the brake or emergency pipe are lapped.

The emergency valve device 18 is embodied in a casing having a piston 130 subject on its left hand side to the combined pressure of a spring 131 and fluid pressure in a chamber 132, and subject on its right hand side to fluid pressure in a slide valve chamber 133. The piston 130 is provided with a stem 134 which is recessed to receive and move a slide valve 135 coextensive with movement of the piston 130.

As illustrated, the piston 130 and slide valve 135 are in their release positions, where a cavity 136 in the slide valve connects the two sections of the straight air pipe 35. At the same time a feed groove 137 provides a charging communication between the chamber 132 and the chamber 133.

Upon a reduction of pressure in the chamber 132 the overbalancing pressure in the chamber 133, which is in open communication with the main reservoir pipe 70, shifts the piston 130 full distance to the left, whereupon the slide valve 135 blanks the left hand portion of the straight air pipe 35 and opens the right hand portion of the straight air pipe to the slide valve chamber 133 and hence to the main reservoir pipe 70. Fluid at main reservoir pressure may then flow to the right hand portion of the straight air pipe.

While I have described only sufficient parts for a single vehicle in a train, it will be quite obvious to those skilled in the art that certain of the parts may be duplicated on trailer vehicles, as is common practice, and thereby provide a complete train braking equipment. The invention therefore is to be considered as applicable to either a single vehicle or a train of vehicles.

The operation of the illustrated embodiment of my invention is as follows:

Running condition

In order to assist in the understanding of the operation of the invention reference will be had to the specific fluid pressures and vehicle speeds hereinbefore mentioned, but it is to be understood that these are employed solely by way of illustration, and that the brake system disclosed may be adjusted or designed to successfully operate at other pressure and speed values.

The main reservoir 20 will be assumed to be charged to a pressure of two hundred pounds or greater. The feed valve device 110 is preferably adjusted to deliver fluid from the main reservoir pipe 70 to the feed valve pipe 111 at a pressure of fifty pounds. Fluid thus delivered to the feed valve pipe 111 will flow to the slide valve chamber 105 in the low speed limiting valve device 14, to the chamber 117 in the low speed pressure maintaining valve device 15, and to the chamber above the double beat valve 58 in the speed responsive device 12.

From the slide valve chamber 105 fluid at feed valve pressure will flow to the pipe 63 and from thence to the chamber 116 in the low speed pressure maintaining valve device 15, to chamber 62 in the speed responsive device 12, to the volume reservoir 16, and to the piston chamber 23 in the control valve device 11.

From the chamber above the double beat valve 58 fluid at feed valve pressure will flow through the pipe 108 to the piston chamber 104 in the low speed limiting valve device 14. Thus the piston 102 in this device will be subject on both sides to fluid at feed valve pressure, and the spring 103 will hold the piston 102 and slide valve 107 in the illustrated positions.

Fluid will then also flow from the slide valve chamber 105 through the pipe 101 and choke 100 to the spring chamber 98, from whence it will flow to the atmosphere through the exhaust port 99. The choke 100 is made very small so that the loss of fluid through this communication is not detrimental to the safety of the brake system. As will be clear later, the size of this choke is so determined that when the vehicle is operating at say its maximum speed of one hundred miles per hour and the train is then allowed to drift with the propelling power off, the escape of fluid through the choke 100 will reduce the pressure in the volume reservoir 16, and the other volumes connected thereto, at a rate substantially the same as the rate of decrease of speed of the vehicle while drifting.

Assuming now that the vehicle or train is traveling above sixty miles per hour, the centrifuge device will produce a force acting downwardly on the sleeve 47 proportional to this speed. This will in turn produce an upward force on the diaphragm 60 which is opposed by the pressure in the chamber 62. The parts are so designed that when fifty pounds of fluid pressure is present in the chamber 62 the upward force produced by the centrifuge device at exactly sixty miles an hour will just be balanced.

But with the vehicle traveling above sixty miles per hour the upward force on the diaphragm 60 will unseat the valve 57 and permit fluid under pressure to flow from the main reservoir pipe 70 to the chamber 62, and the connected volumes, until the downward force due to the fluid pressure slightly overbalances the upward force due to the centrifuge device. The centrifuge lever 55 will then assume the position illustrated, in which position the centrifuge force and the fluid pressure force, acting on the diaphragm 60, are in substantial equilibrium. It should thus be apparent that for vehicle speeds above sixty miles per hour the centrifuge parts move only through very small distances, or just what is required to unseat valve 57 sufficiently to raise the pressure in chamber 62 so as to maintain the equilibrium.

If the vehicle or train is traveling at its top speed, assumed to be one hundred miles per hour, the pressure in the chamber 62 will be a maximum. If the train is allowed to drift from this maximum speed to some lower speed then the fluid pressure acting above diaphragm 60 is reduced in proportion to the reduction in speed. This is taken care of by the small choke 100 in the exhaust valve device 13, as before indicated. That is to say, so long as the vehicle is running at its top speed or some other constant speed above sixty miles per hour, the diaphragm 60 will actuate the valve 57 to maintain the maximum pressure for that speed in the chamber 62 and connected volumes, regardless of the continual leakage of fluid through the choke 100. When, however, the speed reduces, the pressure will reduce due to leakage through the small port 100 until it corresponds to the vehicle speed.

At all times while the vehicle is being propelled under power or drifting the operator maintains the brake valve handle 121 in the release position so that the brake pipe or emergency pipe 123 is maintained charged. The parts of the emergency valve device 18 will then be positioned as illustrated.

Service application

Assuming now that the vehicle or train is traveling above sixty miles an hour, when it is desired to effect a service application of the brakes the operator turns the brake valve handle 121 to service position and leaves it there until sufficient pressure has been established in the straight air pipe according to the desired degree of the brake application. Fluid thus supplied to the straight air pipe flows past the valve 29 in the control valve device, which is now held open due to the pressure in the chamber 23 to the right of the piston 22, and flows through pipe 37 to the brake cylinder 10 and to the piston chamber 94 in the exhaust valve device 13. The piston 93 in the exhaust valve device moves to the right thereby closing the leakage communication to the atmosphere through the small port 100. This prevents any further loss of fluid under pressure while a brake application is being made. Fluid pressure in the brake cylinder 10 operates the wheel brakes to produce the usual braking effect.

If the degree of fluid under pressure supplied to the straight air pipe is greater than the pressure in the piston chamber 23 of the control valve device, the flow of fluid to the chamber 24 to the left of the piston 22 will cause the piston to be shifted to the right to seat the supply valve 29 when brake cylinder pressure equals that in chamber 23. The maximum brake cylinder pressure that can be established is thus determined by the pressure acting to the right of the piston 22, and consequently according to the pressure in the volume reservoir or "master volume" 16. The pressure in the "master volume" therefore determines the maximum permissible brake cylinder pressure at any time.

As the speed of the vehicle is diminished due to the brake application, the force acting below the diaphragm 60 likewise diminishes, substantially inversely as the square of the vehicle speed. This, however, does not diminish the pressure in the chamber 62 and the "master volume" 16, because leakage through the small port 100 in the exhaust valve device 13 can no longer take place because of the movement of the piston 93 to the right under action of brake cylinder pressure. Therefore, whatever pressure is initially established in the brake cylinder is maintained therein until modified by action of the speed responsive device 12 at some low speed, as will now be described.

As the vehicle speed approaches some low value, which will be taken as twenty-five miles per hour, the sleeve 47 will be actuated toward engagement with the stop 51. As before described, this will cause a quick upward movement of the double beat valve 58 to its upper seated position, thereby cutting off supply of fluid under pressure from the feed valve pipe 111 to the pipe 108, and opening a communication between the pipe 108 and the atmosphere by way of the fluted stem below the double beat valve. This will reduce the pressure in the chamber 104 of the low speed limiting valve device 14, whereupon the piston 102 therein will be shifted to the left due to the overbalancing pressure to the right.

The slide valve 107 will be shifted to a position where it blanks the pipe 101 and connects the pipe 63, and "master volume" 16, to the passage 113 leading to the safety valve device 112. The pressure in the "master volume" will therefore be reduced to the safety valve setting, say thirty pounds. The high pressure in the brake cylinder 10 will shift the piston 22 of the control valve device to the right far enough for the slide valve 26 to uncover the exhaust port 33, whereupon brake cylinder pressure will be reduced to a value corresponding to the "master volume" pressure. The control valve device will then hold this pressure in the brake cylinder until the vehicle or train is brought to a stop.

It will therefore be seen that if the brakes are applied at a speed above sixty miles per hour the initial brake cylinder pressure will be maintained until a low speed of twenty-five miles per hour is reached, at which speed the brake cylinder pressure is reduced to a low value and thereafter maintained until the stop is made.

It should further be clear from the foregoing description that since the centrifuge device determines the pressure in the chamber 62, and volume reservoir 16, as a function of speed above sixty miles per hour the initial brake cylinder pressure corresponds to the speed at the time the brakes are applied.

If the brake application is made when the speed of the vehicle is below sixty miles an hour, but above twenty-five miles an hour, the maximum initial brake cylinder pressure which may be established cannot exceed fifty pounds, that is, the feed valve setting. Since the feed valve device 110 is in communication with the chamber 62, and the volume reservoir 16, at all times while the low speed limiting valve device is in the illustrated position, and since this valve device remains in the illustrated position for all speeds above twenty-five miles per hour, it follows that the minimum pressure which may be maintained in the chamber 62 and volume reservoir 16 between the speeds of twenty-five miles per hour and sixty miles per hour is that corresponding to the feed valve setting. Therefore, if the brakes are applied at a speed within this range fifty pounds brake cylinder pressure may be maintained until the speed of twenty-five miles per hour is reached, at which time the brake cylinder pressure will be reduced as before described.

If the brakes are applied while the vehicle or train is traveling at a speed below twenty-five miles per hour, the maximum brake cylinder pressure which may be established is that corresponding to the setting of the safety valve device 112, namely thirty pounds.

If after the train or vehicle is brought to a stop it is to be held at rest for an appreciable length of time, or if the deceleration period is relatively long, the pressure in the volume reservoir 16 may leak away if not intermittently replenished. To prevent this the low speed pressure maintaining valve device 15 functions whenever the pressure in the pipe 63 drops substantially below that corresponding to the safety valve setting to open communication between the feed valve pipe 111 and the pipe 63, and thus maintains the pressure in the volume reservoir, or "master volume", to the desired low value. This additionally ensures adequate braking to stop the train or vehicle and to hold it at rest.

It should be observed that the pressure established in the volume reservoir 16 determines the maximum brake cylinder pressure which may be produced, and if the operator does not care to effect a brake application to the maximum value permissible at the time he may do so, but he can at no time exceed the maximum permissible value by any manipulation of the brake valve handle.

Emergency application

When it is desired to effect an emergency application of the brakes, the operator turns the brake valve handle 121 to the emergency position and leaves it there. This will immediately vent the brake pipe or emergency pipe 123 to the atmosphere, whereupon the piston 130 in the emergency valve device 18 will move to its extreme left hand position and supply fluid at main reservoir pressure to the right hand portion of the straight air pipe 35. At the same time, the brake valve opens a communication directly from the main reservoir 20 to the left hand portion of the straight air pipe, but this portion of the straight air pipe is blanked at the seat of the emergency slide valve 135. Regardless of how fluid under pressure is supplied to the straight air pipe, whether by the brake valve device or by the emergency valve device, the flow to the brake cylinder is governed by the control valve device 11, which limits the brake cylinder pressure according to the pressure in the volume reservoir 16.

In order that the pressure in the volume reservoir shall be higher for an emergency application than for a service application, the chamber 81 in the speed responsive device is connected to the brake pipe or emergency pipe 123. Therefore, as the brake pipe or emergency pipe pressure is reduced the piston 80 moves to the left and shifts the roller 66 to the right, thereby increasing the ratio between the two moment arms of the lever 55 about the roller 66 as the fulcrum point. A given vehicle speed will therefore during an emergency application of the brakes produce a greater upward force on the diaphragm 60 than for a service application. A higher pressure in the chamber 62 will therefore be required to balance this upward force, so that the "master volume" is charged to a higher pressure. This in turn permits a higher brake cylinder pressure, so that an increased degree of brake application is effected.

Release of brake applications

When by manipulation of the brake valve an application of the brakes is effected to a degree lower than that corresponding to the pressure in the "master volume", the application may be released through the control valve device 11 upon turning of the brake valve handle 121 to the release position. This is possible because the control valve device 11 maintains the communication between the straight air pipe and the brake cylinder 10 open at all times so long as the brake cylinder pressure does not exceed the "master volume" pressure.

If, however, a maximum degree of brake application is effected, as during an emergency application, the control valve device will close the communication between the straight air pipe and the brake cylinder when the brake cylinder pressure corresponds to the "master valume" pressure. When this communication is closed the operator can however release the brakes upon turning the brake valve handle 121 to the release position, because fluid may flow from the brake cylinder 10 by way of the one-way check valve device 140 to the straight air pipe 35. The check valve device prevents flow in the opposite direction so that the control valve device may during an application limit the brake cylinder pressure.

When the release is made following a service application, the straight air pipe is vented to the atmosphere immediately and directly by way of cavity 125 in the rotary valve and the exhaust port 126. When the release is made following an emergency application, the brake pipe or emergency pipe 123 must first be charged through the rotary valve, so that the emergency valve device 18 may move to the illustrated position and thus connect the two sections of the straight air pipe, the straight air pipe thereafter being vented as following a service application.

Visual indication of speed range

When an application of the brakes is effected it is desirable that the operator have some knowledge of the speed and permissible braking pressure. The indicating device 118, which is connected to the volume reservoir 16, is provided for this purpose. The pressure in the volume reservoir is an indication of the speed range in which the vehicle is operating. For example, if the indicating device 118 is calibrated to indicate pressure only, and should show an indication of pressure above fifty pounds, the operator would know that the vehicle or train is traveling above sixty miles per hour. Or if the indicating device is calibrated both in pressure and in speed, the device would directly indicate the vehicle speed for all speeds above sixty miles per hour, and would of course indicate the maximum possible braking pressure.

As the vehicle speed drops below sixty miles per hour the device would merely indicate that the speed is between twenty-five miles per hour and sixty miles per hour. As the speed passes below twenty-five miles per hour, the device would so indicate. The pressure scale would at all times indicate the maximum possible braking pressure. Thus the operator is informed of both the maximum permissible braking pressure and the speed conditions by the one device.

While I have described and illustrated my invention in connection with one specific embodiment thereof, it is not my intention to be limited to the exact details of this embodiment or otherwise than by the spirit and scope of the appended claims.

Having now described my invention, what I claim as new and desire to secure by Letters Patent, is:

1. In a vehicle brake system, in combination, a brake cylinder, a volume reservoir adapted to be normally charged with fluid under pressure, means for limiting brake cylinder pressure according to the pressure of fluid in said volume reservoir, means establishing a restricted communication between said volume reservoir and the atmosphere through which fluid under pressure may escape from said volume reservoir to the atmosphere, and means controlled by brake cylinder pressure for controlling said communication.

2. In a vehicle brake system, in combination, a brake cylinder, a volume reservoir adapted to have the pressure therein varied according to the maximum permissible degree of application of the brakes, means for limiting brake cylinder pressure according to the pressure of fluid in said volume reservoir, means establishing a restricted communication between said volume reservoir and the atmosphere, and a valve device operable at a predetermined brake cylinder pressure for closing said communication.

3. In a vehicle brake system, in combination, a brake cylinder, a volume reservoir adapted to be charged with fluid under pressure, means for limiting brake cylinder pressure according to the pressure of fluid in said volume reservoir, means operable over a predetermined speed range of the vehicle for maintaining the pressure in said volume reservoir substantially constant and above a chosen value, and means operable at a vehicle speed lower than any speed within said predetermined speed range for reducing the pressure of fluid in said volume reservoir to a relatively low value and for maintaining said low value therein.

4. In a vehicle brake system, in combination, a brake cylinder, a volume reservoir adapted to be normally charged with fluid under pressure, means for limiting brake cylinder pressure according to the pressure of fluid in said reservoir, means establishing a communication between a source of fluid under pressure and said volume reservoir, a regulating valve device for maintaining the pressure supplied from said source at a substantially constant value, a valve device operable to close the communication from said supply to said volume reservoir, and speed controlled means for controlling operation of said valve device.

5. In a vehicle brake system, in combination, a brake cylinder, a volume reservoir, means operable to limit brake cylinder pressure according to the pressure of fluid in said volume reservoir, means establishing a restricted communication between said volume reservoir and the atmosphere through which fluid under pressure may slowly escape from said volume reservoir to the atmosphere, means controlled by brake cylinder pressure for controlling said communication, and means responsive to the speed of the vehicle for also controlling said communication.

6. In a vehicle brake system, in combination, a brake cylinder, a volume reservoir adapted to be normally charged with fluid under pressure, means establishing a communication through which fluid under pressure is supplied to said brake cylinder, a valve device subject to the pressure of fluid in said volume reservoir for normally maintaining said communication open and operable when the pressure of fluid supplied through said communication equals the pressure of fluid in said volume reservoir for closing said communication, and operable when brake cylinder pressure exceeds volume reservoir pressure for establishing a communication between the brake cylinder and atmosphere to reduce brake cylinder pressure, means for establishing fluid pressures in said volume reservoir corresponding to vehicle speed over a chosen speed range, means establishing a restricted communication between said volume reservoir and the atmosphere through which fluid under pressure may slowly escape to the atmosphere, means operable at a chosen brake cylinder pressure for closing said restricted communication, and means operable when the speed of the vehicle diminishes to a speed below any within said chosen speed range for reducing the pressure in said volume reservoir to a relatively low value, whereby the maximum brake cylinder pressure is correspondingly reduced by said valve device.

7. In a vehicle brake system, in combination, a brake cylinder, a valve device controlling a communication through which fluid under pressure is supplied to said brake cylinder and operable to limit brake cylinder pressure according to the pressure of fluid in a chamber therein, a valve mechanism having a normally biased position and being shiftable to a second position, means operable when said valve mechanism is shifted to said second position for reducing the pressure of fluid in said chamber, and speed controlled means operable at a predetermined low vehicle speed for shifting said valve mechanism to said second position.

8. In a vehicle brake system, in combination, a movable abutment, speed responsive means for producing on one side of said abutment a force corresponding to the speed of the vehicle, means for producing on the other side of said abutment fluid pressure to a degree sufficient to counterbalance the force produced by said speed responsive means, means for limiting the maximum degree of application of the brakes according to the degree of fluid pressure which balances the opposing force, and means operable when effecting an emergency application of the brakes for causing said speed responsive means to produce for a given speed a greater force on said movable abutment than for service applications of the brakes.

9. In a vehicle brake system, in combination, a lever, a movable fulcrum for said lever, said fulcrum being adapted to move along said lever intermediate its ends, speed responsive means for producing on one end of said lever a force corresponding to the speed of the vehicle, fluid pressure means for producing on the other end of said lever a counterbalancing force whereby to maintain said lever in equilibrium, means for limiting the degree of application of the brakes according to the fluid pressure which maintains said lever in equilibrium, and means operative upon effecting an emergency application of the brakes for shifting said fulcrum to a position requiring a higher fluid pressure to maintain said lever in equilibrium.

10. In a vehicle brake system, in combination, a lever, means for providing a fulcrum for said lever intermediate its ends, speed responsive means for producing on one end of said lever a force proportional to the speed of the vehicle, means for producing on the other end of said lever a counterbalancing force by fluid pressure, means for varying the degree of fluid pressure acting on the said other end of said lever as the force acting on said first mentioned end of said lever varies with variation in vehicle speed, and brake control means for controlling the degree of application of the brakes according to the degree of fluid pressure which maintains said lever in balanced position.

11. In a vehicle brake system, in combination, means for establishing in a fixed volume a fluid pressure, means for adjusting said fluid pressure to correspond to the speed of the vehicle as the speed varies over a predetermined range, said two preceding means being operative before initiating an application of the brakes, means operative upon initiating an application of the brakes to limit the initial degree of the application to a value corresponding to the fluid pressure in said volume at the time of initiating the application, means cooperating with said preceding means to maintain the initial degree of the application substantially constant over a predetermined decreasing speed range of the vehicle, and means operative at a chosen low vehicle speed for diminishing the pressure in said volume and thereby causing the degree of the application to be correspondingly diminished.

12. In a vehicle brake system, in combination, a brake cylinder, a volume reservoir, means for effecting a supply of fluid under pressure to said volume reservoir from an established source, means including a device operated by and in response to the speed of the vehicle for controlling said supply and operative to cause the pressure in said reservoir to vary with variations in speed of the vehicle, means establishing a communication through which fluid under pressure is supplied to said brake cylinder to effect an application of the brakes, and a valve device normally subject to the pressure of fluid in said volume reservoir for maintaining said communication open, and operable to close said communication when brake cylinder pressure equals or exceeds the pressure in said volume reservoir.

13. In a vehicle brake system, in combination, a brake cylinder, a volume reservoir, means for effecting a supply of fluid under pressure to said volume reservoir from an established source, means including a centrifuge device operated by and in response to the speed of the vehicle for varying the pressure of fluid in said reservoir to correspond to the speed of the vehicle, means for effecting a supply of fluid under pressure to said brake cylinder, means for limiting the degree of brake cylinder pressure according to the pressure of fluid in said volume reservoir, and means operative upon effecting said supply to said brake cylinder for inhibiting variation of pressure in said volume reservoir by said speed controlled means.

14. In a vehicle brake system, in combination, a brake cylinder, a volume reservoir, means for supplying fluid under pressure to said reservoir from an established source, means for establishing a communication through which fluid under pressure is supplied to said brake cylinder, a valve device subject to the pressure of fluid in said volume reservoir for maintaining said communication open and operable when brake cylinder pressure equals or exceeds the pressure in said volume reservoir for closing said communication, means operable before effecting a supply of fluid under pressure to said brake cylinder for establishing fluid pressure in said volume reservoir, a centrifuge device operated by and in accordance with the speed of the vehicle, and means controlled by said centrifuge device for controlling the pressure of fluid established in said reservoir, and operable before pressure has been established in said brake cylinder to cause the pressure in said reservoir to vary in accordance with variations in speed of the vehicle.

15. In a vehicle brake system, in combination, a brake cylinder, a volume reservoir adapted to be normally charged with fluid under pressure, means for limiting brake cylinder pressure according to the pressure of fluid in said reservoir, means establishing a communication between a source of fluid under pressure and said volume reservoir, a regulating valve device for maintaining the pressure of fluid supplied from said source at a substantially constant value, a valve device operable to close the communication from said supply to said volume reservoir and to reduce the pressure in said reservoir, a centrifuge device operated by and in accordance with the speed of the vehicle, and means controlled by said centrifuge device for controlling the operation of said valve device.

16. In a vehicle brake system, in combination, a lever, means providing a fulcrum for said lever intermediate its ends, a centrifuge device connected to one end of said lever and operable to produce a force on that end proportional to the speed of the vehicle, a movable abutment having a chamber to one side thereof and operative to produce on the other end of said lever a force proportional to the pressure of fluid in said chamber, means including a valve mechanism so constructed and arranged that only very small movements of said lever are required to vary the pressure of fluid in said chamber in accordance with the variations of force produced on the first mentioned end of said lever by said centrifuge device in response to variations in vehicle speed, and brake control means for controlling the degree of application of the brakes according to the degree of fluid pressure in said chamber.

17. The method of controlling applications of vehicle brakes, which comprises, establishing before effecting a brake application a force which is proportional to vehicle speed, establishing before effecting a brake application a fluid pressure the force effect of which just counterbalances said first force, maintaining said two force effects balanced as the vehicle speed varies over a predetermined speed range by varying the degree of fluid pressure in response to variations in the speed-produced force, effecting an application of the brakes, limiting the initial degree of application of the brakes to a value corresponding to the force effect produced by said fluid pressure, maintaining the initial degree of application of the brakes substantially constant over a predetermined decreasing speed range of the vehicle regardless of the balance or unbalance of said two force effects, and then at the end of said decreasing speed range decreasing the degree of application of the brakes in one step to a lower degree and maintaining this lower degree substantially constant until the vehicle has been brought to a stop.

18. The method of controlling applications of vehicle brakes, which comprises, establishing in a confined volume while the brakes are released a fluid pressure which is proportional to vehicle speed over a predetermined speed range and which is independent of speed over a different speed range, initiating an application of the brakes and limiting the initial degree of the application to a value substantially equivalent to the fluid pressure which exists in said volume at the time of initiating the application, maintaining the initial degree of application substantially constant over a predetermined decreasing speed range of the vehicle regardless of whether the degree of fluid pressure in said volume varies or not, and then at a chosen low vehicle speed diminishing the degree of the application to a low chosen value.

RAYMOND E. MILLER.